United States Patent
Kinoshita et al.

(10) Patent No.: US 8,341,124 B2
(45) Date of Patent: Dec. 25, 2012

(54) SALES SUPPORT SYSTEM, SALES SUPPORT METHOD AND SALES SUPPORT PROGRAM

(75) Inventors: Takashi Kinoshita, Kanagawa (JP); Takashi Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 701 days.

(21) Appl. No.: 12/579,896

(22) Filed: Oct. 15, 2009

(65) Prior Publication Data
US 2010/0121821 A1 May 13, 2010

(30) Foreign Application Priority Data
Nov. 7, 2008 (JP) .................................. 2008-286891

(51) Int. Cl.
*G06F 17/30* (2006.01)
(52) U.S. Cl. ......................................... 707/661; 725/46
(58) Field of Classification Search .................. 707/661; 725/46
See application file for complete search history.

(56) References Cited

U.S. PATENT DOCUMENTS
2003/0066071 A1* 4/2003 Gutta et al. ...................... 725/10
2006/0015902 A1* 1/2006 Matsuura et al. ................ 725/46

FOREIGN PATENT DOCUMENTS
JP 2003-337690 11/2003

* cited by examiner

*Primary Examiner* — James Trujillo
*Assistant Examiner* — Alan Graham
(74) *Attorney, Agent, or Firm* — Oblon, Spivak, McClelland, Maier & Neustadt, L.L.P.

(57) ABSTRACT

A sales support system, a sales support method and a sales support program are disclosed. The sales support system which includes a content database, a viewing history database, an authentication unit, an application updating unit, a storage medium storing content specifying unit, a recording position information extraction unit, a corresponding content existence determination unit, a recording position data transmission unit and a recorded content relevant data transmission unit.

8 Claims, 8 Drawing Sheets

FIG. 5

| SERIES INFORMATION (b) | TITLE INFORMATION (a) | PLAYLIST INFORMATION (d) | | META DATA (c) | GUI (e) |
|---|---|---|---|---|---|
| J-LEAGUE YEARBOOK<br>TITLE a<br>TITLE b<br>TITLE c<br>TITLE d<br>⋮ | TITLE a<br>ID:A00001<br>-<br>A09999 | COMMON | | 2005 ALL GOALS OF J-LEAGUE CLUB XXX PLAYER INTERVIEWS | |
| | | PLAYLIST1 0:00:00-0:05:00 | CONTENT ID XXXX | PLAYER A GOAL, RIGHT LEG KICK | |
| | | PLAYLIST2 0:00:05-0:08:00 | CONTENT ID XXXX | PLAYER B GOAL, HEADING, HAT TRICK | Ver1.1<br>UPDATED<br>AUGUST 20, 2007 |
| | | PLAYLIST3 0:00:08-0:10:00 | CONTENT ID XXXX | PLAYER C | |
| | | ⋮ | | ⋮ | |
| | TITLE b<br>ID:B00001<br>-<br>B09999 | COMMON | | 2005 ALL GOALS OF J-LEAGUE CLUB YYY PLAYER INTERVIEWS | |
| | | PLAYLIST1 0:00:00-0:05:00 | CONTENT ID XXXX | PLAYER X GOAL, RIGHT LEG KICK | |
| | | PLAYLIST2 0:00:05-0:08:00 | CONTENT ID XXXX | PLAYER Y GOAL, OWN GOAL | |
| | | PLAYLIST3 0:00:08-0:10:00 | CONTENT ID XXXX | PLAYER Z | |
| | | ⋮ | | ⋮ | |
| | TITLE c<br>ID:C00001<br>-<br>C09999 | | | 2005 ALL GOALS OF J-LEAGUE CLUB YYY PLAYER INTERVIEWS | |
| | | PLAYLIST1 0:00:00-0:05:00 | CONTENT ID XXXX | PLAYER α GOAL, RIGHT LEG KICK, WHOSE 100TH GOAL IN J-LEAGUE | |

FIG. 6

| USER INFORMATION (p) | AVAILABLE TITLE INFORMATION (q) | VIEWING LOG INFORMATION (r) | |
|---|---|---|---|
| USER A ID:AAAAA | TITLE a ID:A00001 | 4/1/2007 18:00 PLAYLIST1 0:00:00-0:05:00 | CONTENT ID XXXX |
| | | 4/5/2007 12:00 PLAYLIST5 0:15:00-0:18:00 | CONTENT ID XXXX |
| | | 5/2/2007 23:00 PLAYLIST5 0:15:00-0:15:30 | CONTENT ID XXXX |
| | TITLE b ID:B00001 | 4/3/2007 18:00 PLAYLIST4 ...XX:XX:XX-XX:XX:XX | CONTENT ID XXXX |
| USER B ID:BBBBB | TITLE b ID:B00002 | 5/8/2007 09:00 PLAYLIST20 ...YY:YY:YY-YY:YY:YY | CONTENT ID XXXX |
| | TITLE c ID:C00001 | 4/1/2007 21:00 PLAYLIST1 ...ZZ:ZZ:ZZ-ZZ:ZZ:ZZ | CONTENT ID XXXX |

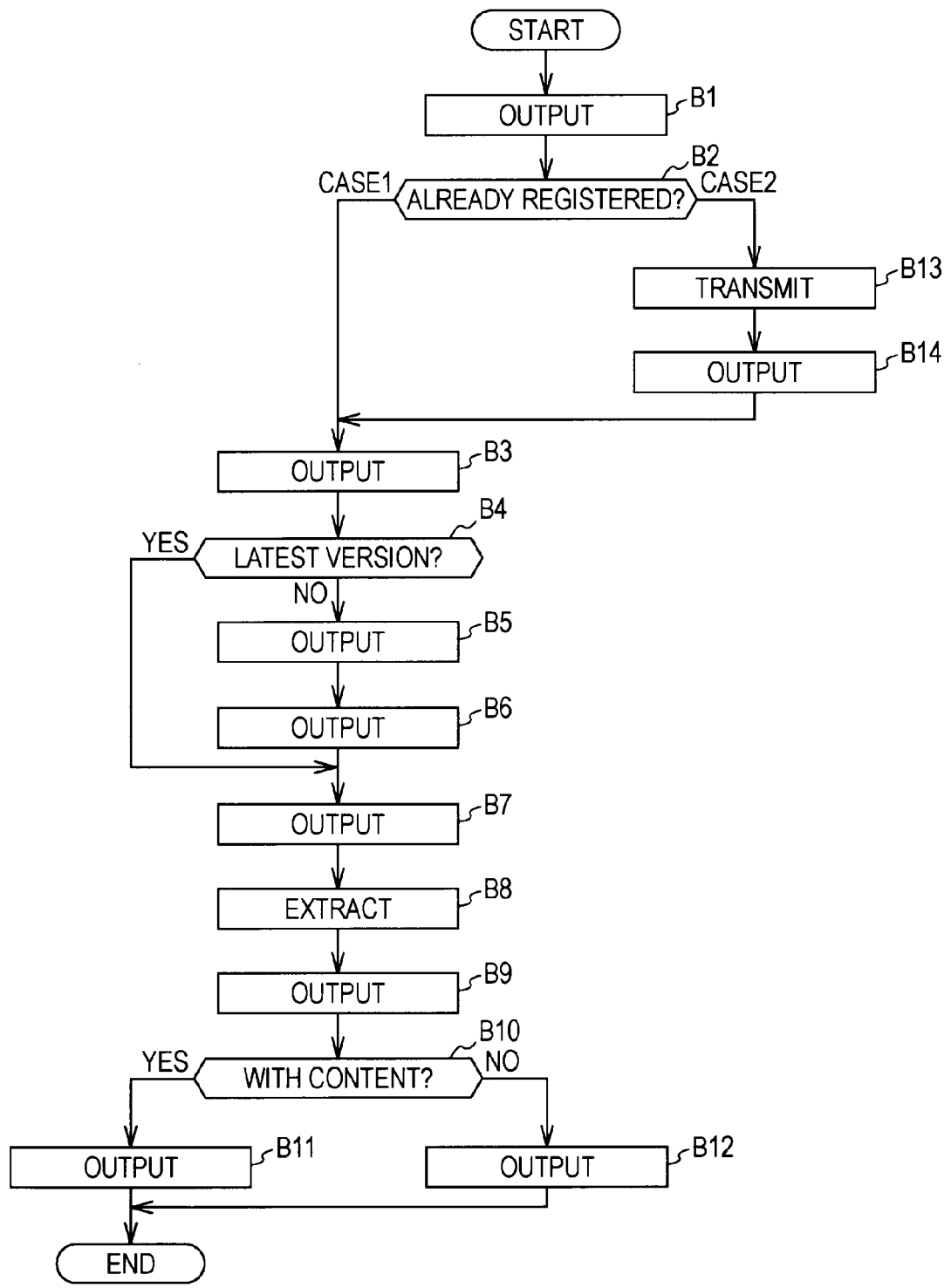

SALES SUPPORT SYSTEM, SALES SUPPORT METHOD AND SALES SUPPORT PROGRAM

BACKGROUND OF THE INVENTION

1. Field of the Invention

The present invention relates to a sales support system, a sales support method and a sales support program which provide, via a network, a user with relevant information of content including data that matches a search keyword selected by the user.

2. Description of the Related Art

In a related art sales support system, a sales promotion content, such as a catalog for promoting sales of an article, is transmitted to a device installed in a shop via a network, and provides a user with a printed matter produced by the device installed in the shop on the basis of the transmitted data so as to support sales promotion of the article (see Japanese Unexamined Patent Application, First Publication No. 2003-337690).

SUMMARY OF THE INVENTION

However, in such a sales system, it is necessary to transmit sales promotion content to a device installed in a shop via a communication network. For example, if a user reproduces a storage medium, such as a DVD-ROM and a BD-ROM, previously storing content provided by a content provider at places other than a shop, for example, home, this system itself is not easily applied in order to provide content for sales promotion.

Generally, it is desirable for a content provider which provides a storage media, such as DVD-ROM and BD-ROM, previously storing the content to understand how a user views the content after the storage medium is sold from a viewpoint of determining sales strategy of an article.

However, in accordance with the present inventors study about the storage medium, a technique is yet to be provided that a content provider directly understands how a user view the content after the storage medium is sold.

In accordance with further studies of the present inventors about the storage medium, regarding a technique that a content provider provides a user with a new way of enjoying the content stored in the storage media, such as a DVD-ROM and a BD-ROM, only the technique of advertising the new storage medium indirectly through a distributor or advertisement is used.

The present inventors have intensively studied on storage media and have found that there are industrial demand, in the field of the storage media including DVD-ROMs and BD-ROMs which is on the way of further development, for a sales support system, a sales support method and a sales support program. In particular, from the viewpoint of increasing the demand for the storage media, there are demands for a sales support system, a sales support method and a sales support program that provide novel entertainment regarding storage media, improve customer satisfaction of a user who owns a reproduction device which can reproduce a storage medium that can provide such novel entertainment and stimulate a purchasing interest of the user with respect to the storage medium and the reproduction device.

It is therefore desirable to provide a sales support system, a sales support method, and a sales support program that improve customer satisfaction of the user who owns the reproduction device and stimulate a purchasing interest of the user.

The spirit of the invention is to achieve effects that customer satisfaction of the user who owns the reproduction device is improved and that the purchasing interest of the user is stimulated by a configuration in which "if the content including the data that matches the search keyword is registered in the viewing history database, data regarding the recording position at which the content including the data that matches the search keyword is recorded is transmitted to a reproduction device, and, if the content including the data that matches the search keyword is not registered in the viewing history database, data regarding a name of the storage medium which stores the content including the data that matches the search keyword and data regarding a name of a series to which the storage medium storing the content is recorded belongs are transmitted to the reproduction device."

The term "meta data" used herein is a collective name of data relevant to the content recorded on the storage medium and includes, for example, data regarding places, times, persons, meanings and specifications.

The term "retrieval screen" used herein may also be called a graphical user interface (GUI).

The term "search keyword" used herein may also be called a searcher.

The spirit of the invention will be embodied by the following means.

A first embodiment of the invention is a sales support system which includes: a content database which stores, in a mutually correlated manner, a content ID individually allocated to all content, an individual identification ID allocated to a storage medium storing content, a name of the storage medium, content specifying information which includes a name of a series to which the storage medium belongs, meta data which is data relating the content, data regarding a recording position of the content on the storage medium corresponding to the meta data and a file of a retrieval application which causes a retrieval screen on which a user retrieves content relevant to the content stored in the storage medium to be displayed on a display unit of a reproduction device that is currently reproducing the content; a viewing history database storing, in a mutually correlated manner, a user ID allocated to each user, an individual identification ID allocated to a storage medium owned by the user, the name of the storage medium storing at least one content, a content ID individually allocated to content included in the storage medium, and viewing history-relevant information including a viewing time during which the user corresponding to the user ID viewed the content; an authentication unit configured to authenticate whether the user who tries to access is a registered user by determining whether a user ID transmitted from the reproduction device that is currently reproducing the content is stored in the viewing history database; an application updating unit configured to update data of the retrieval application by transmitting the latest version of the retrieval application to the reproduction device, when the user who tries to access is found to be a registered user in accordance with the authentication by the authentication unit and if the version of the retrieval application installed in the reproduction device is not the latest version; a storage medium storing content specifying unit configured to specify, after the application updating unit updated the data, an individual identification ID allocated to the storage medium, an arbitrary search keyword selected by the user, a content ID individually allocated to content stored in the storage medium in accordance with a retrieval result if a retrieval request for retrieving the content database is received from the reproduction device, the content database is retrieved with the individual identification ID being used as a search key, the name of the storage medium storing the content and the name of the series to which the content belongs; a recording position information extraction unit configured to extract, from total data of the content specified by the storage medium storing content specifying unit, information about a recording position on the storage medium storing the data corresponding to the search keyword; a corresponding content existence determination unit configured to determine whether the content including the data that matches the search keyword is stored in the viewing history database by retrieving the viewing history database by using, as a search key, the content ID allocated to the content including the data that matches the search keyword; a recording position data transmission unit configured to transmit data regarding the recording position at which the content including the data that matches the search keyword is recorded to the reproduction device if the content including the data that matches the search keyword is found to be registered in the viewing history database in accordance with determination by the corresponding content existence determination unit; and a recorded content relevant data transmission unit configured to transmit data regarding the name of the storage medium which stores the content including the data that matches the search keyword and data regarding the name of a series to which the storage medium storing the content is recorded belongs to the reproduction device if the content including the data that matches the search keyword is not found to be registered in the viewing history database in accordance with the determination by the corresponding content existence determination unit.

If the content including the data that matches the search keyword is registered in the viewing history database, data regarding the recording position at which the content including the data that matches the search keyword is recorded is transmitted to the reproduction device.

If the content including the data that matches the search keyword is not registered in the viewing history database, data regarding the name of the storage medium which stores the content including the data that matches the search keyword and data regarding the name of a series to which the storage medium storing the content is recorded belongs are transmitted to the reproduction device.

With this configuration, since it is possible to directly transmit the name of the storage medium storing the content the user does not have including the content that matches the search keyword and the name of the series to which the content belongs to the user of the reproduction device, customer satisfaction of the user who owns the reproduction device can be improved and therefore a purchasing interest of the user can be stimulated.

A second embodiment of the invention is a sales support method which includes the steps of: authenticating whether the user who tries to access is a registered user by determining whether a user ID transmitted from the reproduction device that is currently reproducing the content is stored in a viewing history database storing, in a mutually correlated manner, a user ID allocated to each user, an individual identification ID allocated to a storage medium owned by the user, a name of the storage medium storing at least one content, a content ID individually allocated to content included in the storage medium, and viewing history-relevant information including a viewing time during which the user corresponding to the user ID viewed the content; updating an application to update data of the retrieval application by transmitting the latest version of the retrieval application to the reproduction device, when the user who tries to access is found to be a registered user in accordance with the authentication at the step of authenticating and if the version of the retrieval application installed in the reproduction device is not the latest version; specifying, after the step of updating the application to update data, content held by the storage medium by, when an individual identification ID allocated to the storage medium, an arbitrary search keyword selected by the user and a retrieval request for retrieving the content database are received from the reproduction device, retrieving a content database storing, in a mutually correlated manner, content specifying information including a content ID allocated to all the content with the individual identification ID being a search key, an individual identification ID allocated to the storage medium storing the content, the name of the storage medium and a name of a series to which the storage medium storing the content belongs, meta data which is data regarding the content, data regarding a recording position of the content on the storage medium corresponding to the meta data, a file of a retrieval application which causes a retrieval screen on which a user retrieves content relevant to the content stored in the storage medium to be displayed on a display unit of a reproduction device that is currently reproducing the content, and specifying a content ID individually allocated to content stored in the storage medium in accordance with a retrieval result, the name of the storage medium storing the content and the name of the series to which the content belongs; extracting a recording position information, from total data of the content specified at the storage medium storing content specifying step, information about a recording position on the storage medium storing the data corresponding to the search keyword; determining a corresponding content existence to determine whether the content including the data that matches the search keyword is stored in the viewing history database by retrieving the viewing history database by using, as a search key, the content ID allocated to the content including the data that matches the search keyword; transmitting a recording position data to transmit data regarding the recording position at which the content including the data that matches the search keyword is recorded to the reproduction device if the content including the data that matches the search keyword is found to be registered in the viewing history database in accordance with determination at the step of determining the corresponding content existence; and transmitting a recorded content relevant data to transmit data regarding the name of the storage medium which stores the content including the data that matches the search keyword and data regarding the name of a series to which the storage medium storing the content is recorded belongs to the reproduction device if the content including the data that matches the search keyword is not found to be registered in the viewing history database in accordance with the determination at the step for determining the corresponding content existence.

If the content including the data that matches the search keyword is registered in the viewing history database, data regarding the recording position at which the content including the data that matches the search keyword is recorded is transmitted to the reproduction device.

If the content including the data that matches the search keyword is not registered in the viewing history database, data regarding the name of the storage medium which stores the content including the data that matches the search keyword and data regarding a name of a series to which the storage medium storing the content is recorded belongs are transmitted to the reproduction device.

Since the name of the storage medium storing the content the user does not have including the content that matches the search keyword and the name of the series to which the content belongs can be transmitted directly to the user of the reproduction device, customer satisfaction of the user who owns the reproduction device can be improved and a purchasing interest of the user can be stimulated.

A third embodiment of the invention is a sales support program which causes a computer of the application server device the procedures of: authenticating whether the user who tries to access is a registered user by determining whether a user ID transmitted from the reproduction device that is currently reproducing the content is stored in a viewing history database storing, in a mutually correlated manner, a user ID allocated to each user, an individual identification ID allocated to a storage medium owned by the user, a name of the storage medium storing at least one content, a content ID individually allocated to content included in the storage medium, and viewing history-relevant information including a viewing time during which the user corresponding to the user ID viewed the content; updating an application to update data of the retrieval application by transmitting the latest version of the retrieval application to the reproduction device, when the user who tries to access is found to be a registered user in accordance with the authentication at the procedure of authenticating and if the version of the retrieval application installed in the reproduction device is not the latest version; specifying, after the procedure of updating the application to update data, content held by the storage medium by, when an individual identification ID allocated to the storage medium, an arbitrary search keyword selected by the user and a retrieval request for retrieving the content database are received from the reproduction device, retrieving a content database storing, in a mutually correlated manner, content specifying information including a content ID allocated to all the content with the individual identification ID being a search key, an individual identification ID allocated to the storage medium storing the content, the name of the storage medium and a name of a series to which the storage medium storing the content belongs, meta data which is data regarding the content, data regarding a recording position of the content on the storage medium corresponding to the meta data, a file of a retrieval application which causes a retrieval screen on which a user retrieves content relevant to the content stored in the storage medium to be displayed on a display unit of a reproduction device that is currently reproducing the content, and specifying a content ID individually allocated to content stored in the storage medium in accordance with a retrieval result, the name of the storage medium storing the content and the name of the series to which the content belongs; extracting a recording position information, from total data of the content specified at the storage medium storing content specifying procedure, information about a recording position on the storage medium storing the data corresponding to the search keyword; determining a corresponding content existence to determine whether the content including the data that matches the search keyword is stored in the viewing history database by retrieving the viewing history database by using, as a search key, the content ID allocated to the content including the data that matches the search keyword; transmitting a recording position data to transmit data regarding the recording position at which the content including the data that matches the search keyword is recorded to the reproduction device if the content including the data that matches the search keyword is found to be registered in the viewing history database in accordance with determination at the procedure of determining the corresponding content existence; and transmitting a recorded content relevant data to transmit data regarding the name of the storage medium which stores the content including the data that matches the search keyword and data regarding the name of a series to which the storage medium storing the content is recorded belongs to the reproduction device if the content including the data that matches the search keyword is not found to be registered in the viewing history database in accordance with the determination at the procedure for determining the corresponding content existence.

Accordingly, if the content including the data that matches the search keyword is registered in the viewing history database, data regarding the recording position at which the content including the data that matches the search keyword is recorded is transmitted to the reproduction device.

If the content including the data that matches the search keyword is not registered in the viewing history database, data regarding the name of the storage medium which stores the content including the data that matches the search keyword and data regarding the name of a series to which the storage medium storing the content is recorded belongs are transmitted to the reproduction device.

Since the name of the storage medium storing the content the user does not have including the content that matches the search keyword and the name of the series to which the content belongs can be transmitted directly to the user of the reproduction device, customer satisfaction of the user who owns the reproduction device can be improved and a purchasing interest of the user can be stimulated.

According to the invention, if the content including the data that matches the search keyword is registered in the viewing history database, data regarding the recording position at which the content including the data that matches the search keyword is recorded is transmitted to the reproduction device.

If the content including the data that matches the search keyword is not registered in the viewing history database according to the invention, data regarding the name of the storage medium which stores the content including the data that matches the search keyword and data regarding the name of a series to which the storage medium storing the content is recorded belongs are transmitted to the reproduction device.

According to the invention, since the name of the storage medium storing the content the user does not have including the content that matches the search keyword and the name of the series to which the content belongs can be transmitted directly to the user of the reproduction device, customer satisfaction of the user who owns the reproduction device can be improved and a purchasing interest of the user can be stimulated.

BRIEF DESCRIPTION OF THE DRAWINGS

FIG. 5 is a schematic diagram illustrating an exemplary content database held by a content database server device 3 incorporated in the sales support system SS according to the embodiment;

FIG. 6 is a schematic diagram illustrating an exemplary viewing history database held by a viewing history database server device incorporated in the sales support system SS according to the embodiment;

FIG. 9 is a flowchart illustrating an execution process executed by an application server device 2 incorporated in the sales support system SS according to the embodiment.

DESCRIPTION OF THE PREFERRED EMBODIMENTS

Figure 1:
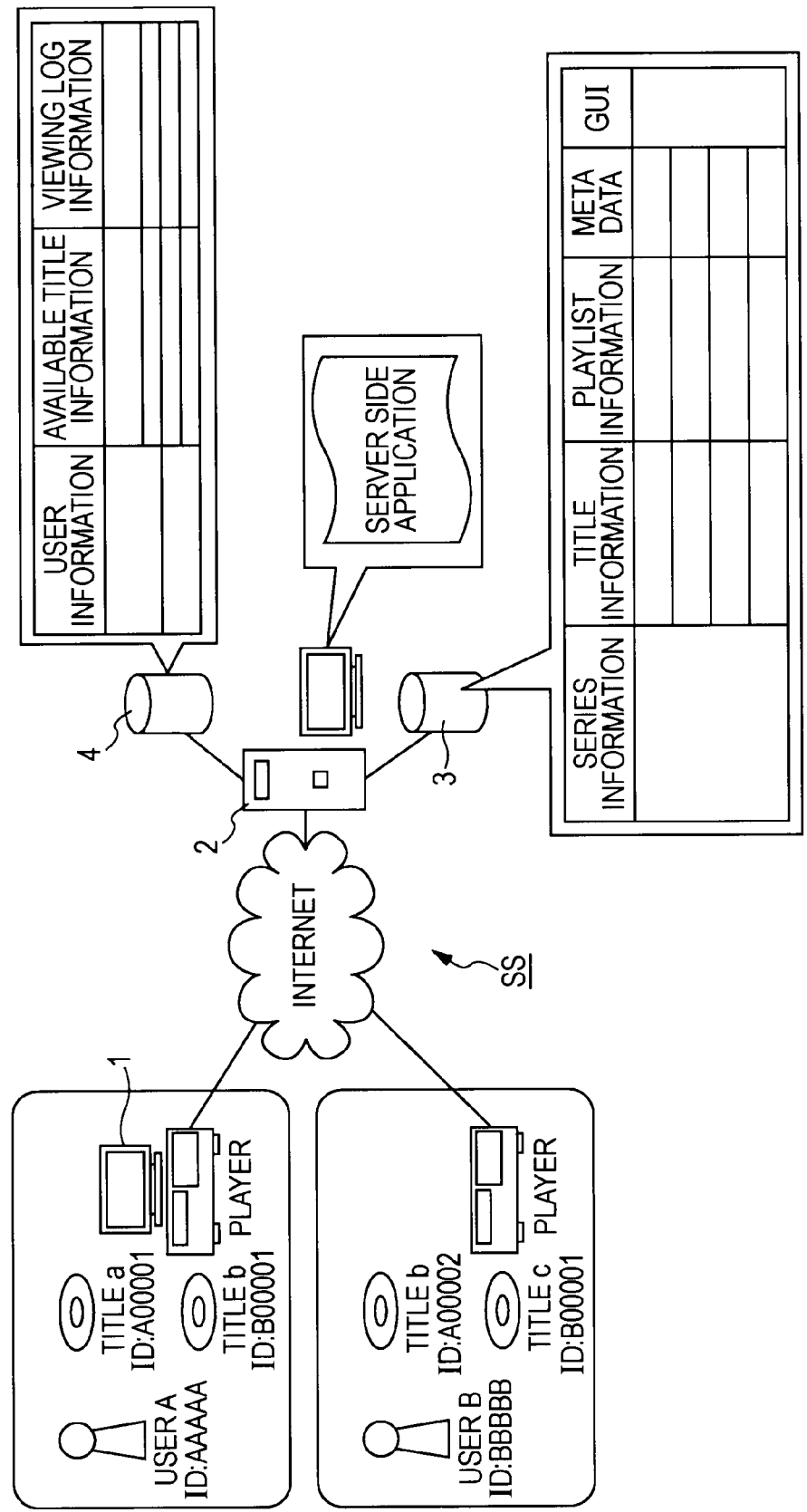
FIG. 1 is a schematic diagram illustrating an exemplary overall structure of a sales support system SS according to a first embodiment of the invention.

The best mode for implementing the invention (hereinafter, referred to as an "embodiment") will be described below. Description will be given in the following order.
1. First Embodiment
2. Modified Embodiment

1. First Embodiment

Overall Structure of Sales Support System

Referring now to the drawings, the best mode of the invention will be described.

FIG. 1 is a schematic diagram illustrating an exemplary overall structure of a sales support system SS according to a first embodiment of the invention.

Figure 2:
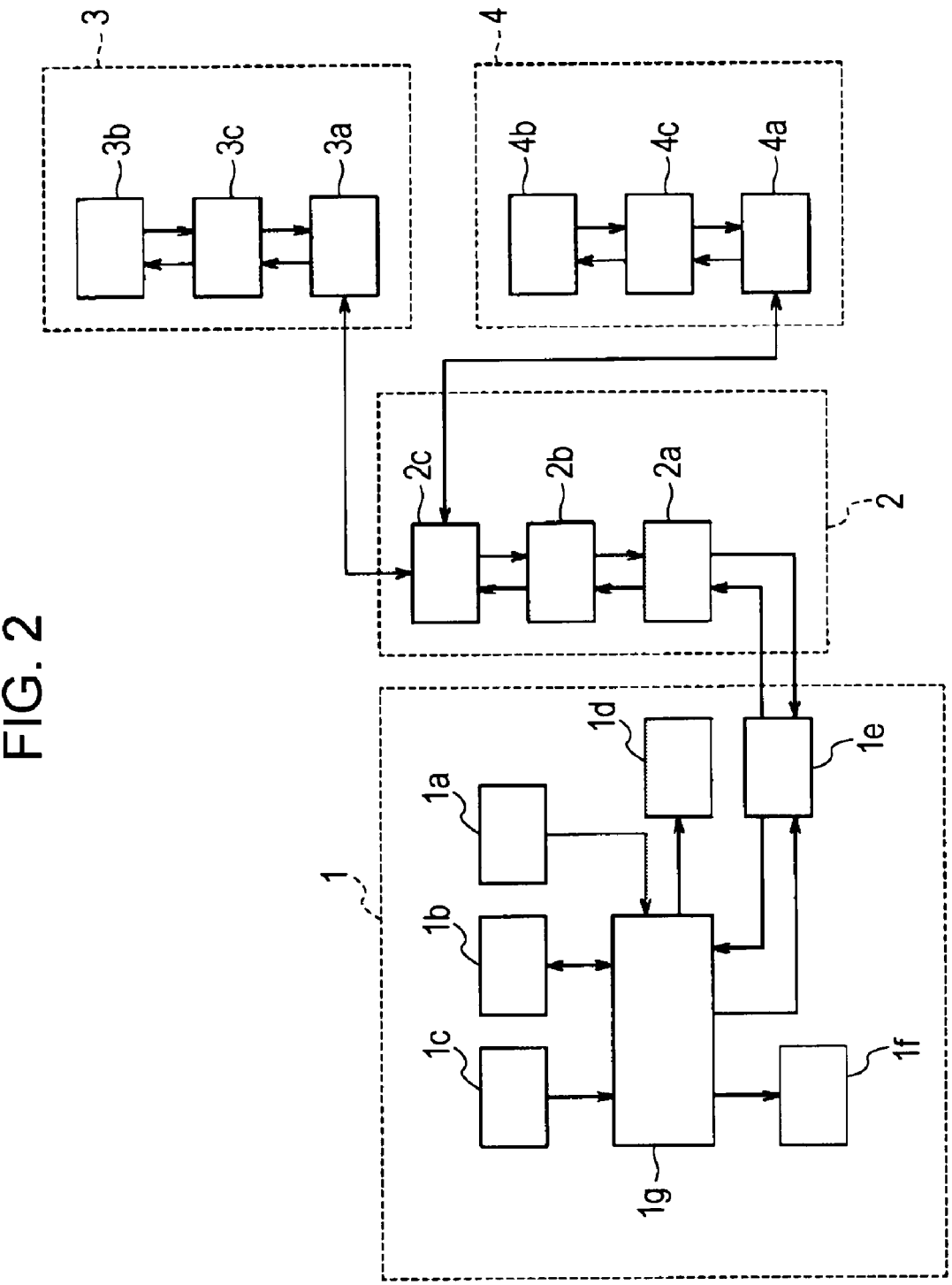
FIG. 2 is a block diagram illustrating the exemplary overall structure of the sales support system SS according to the embodiment.

FIG. 2 is a block diagram illustrating an exemplary overall structure of the sales support system SS according to the present embodiment.

Figure 3:
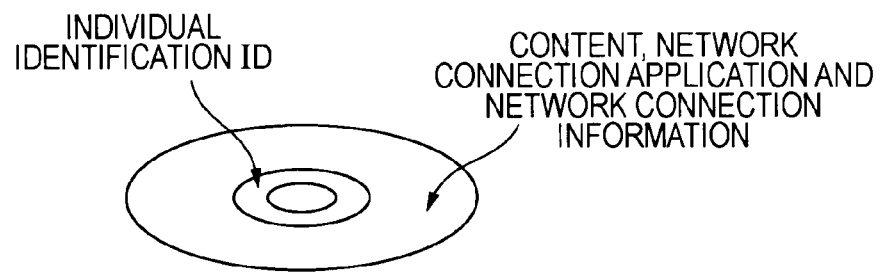
FIG. 3 is a schematic diagram illustrating an exemplary storage medium which is reproduced by a reproduction device incorporated in the sales support system SS according to the embodiment.

In the sales support system SS according to the present embodiment, a provider of the content stored in the storage medium as illustrated in FIG. 3 provides a user who purchased the storage medium storing the content with the latest version of a retrieval application that encourages the user to make a retrieval relating to the content at the time of reproduction of the content recorded on the storage medium.

The sales support system SS provides a user with information regarding the content in which data matching a search keyword is included in accordance with the selected search keyword in a viewable manner when the user selects the search keyword using a retrieval application for of the provided latest version.

For example, in the sales support system SS, when the user selects a search keyword and makes a search using a provided retrieval application, if the storage medium storing content which includes data matching the search keyword is registered in the viewing history database, data regarding a recording position at which the data is recorded is provided to the user in a viewable manner.

In the sales support system SS, when the user selects a search keyword using a provided retrieval application and makes a search, if a storage medium storing the content which includes data matching the search keyword is not registered in the viewing history database, a name of the storage medium storing the content that the user does not have and a name of a series to which the storage medium including the content is recorded belongs are provided to the user in a viewable manner.

The sales support system SS according to the present embodiment includes a reproduction device 1, an application server device 2, a content database server device 3 and a viewing history database server device 4. The application server device 2 is connected to the reproduction device 1 via a network, such as the Internet. The content database server device 3 is connected to the application server device 2 via a network, such as a LAN and a WAN. The viewing history database server device 4 is connected to the application server device 2 via a network, such as the LAN and the WAN.

Configuration of Reproduction Device 1

First, the reproduction device 1 incorporated in the sales support system SS according to the present embodiment will be described.

The reproduction device 1 has a disc tray, which is not illustrated, which can be opened and closed by, for example, a remote controller which is not illustrated. The content included in the storage medium is reproduced when the a reproduction operation of the content of the storage medium is made using, for example, the remote controller with the storage medium being placed on the disc tray.

When the reproduction operation of the content of the storage medium is made using, for example, the remote controller, the reproduction device 1 reads the individual identification ID allocated to the storage medium and transmits the read individual identification ID and an update request for updating the application for retrieval to the application server device 2.

FIG. 3 is a schematic diagram illustrating an exemplary storage medium to be reproduced by the reproduction device 1 incorporated in the sales support system SS according to the present embodiment.

The storage medium is a circular, flat shaped plate-like disc which includes a first storage area and a second storage area. The first storage area stores an inherent individual identification ID. The second storage area stores an application for network connection and network connection information necessary for connecting networks.

Figure 4:
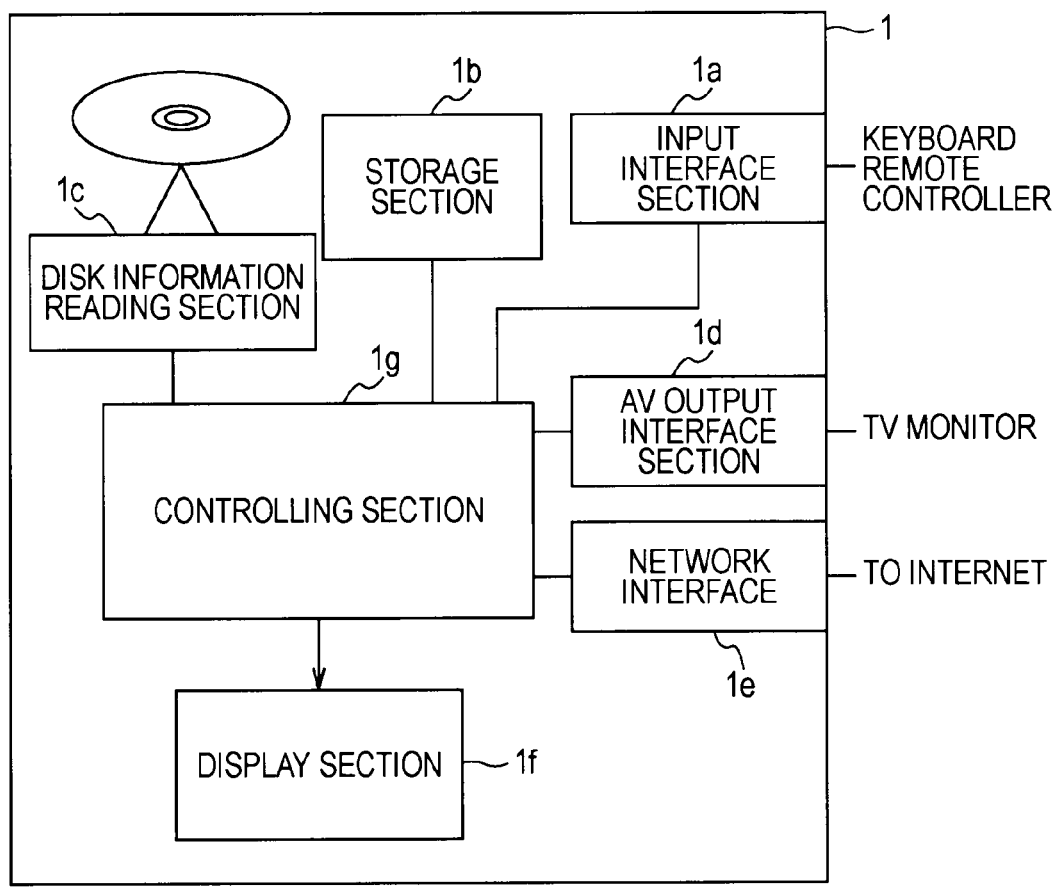
FIG. 4 is a functional block diagram illustrating an exemplary overall structure of the reproduction device incorporated in the sales support system SS according to the embodiment.

FIG. 4 is a functional block diagram illustrating an exemplary overall structure of the reproduction device 1 incorporated in the sales support system SS according to the present embodiment.

The reproduction device 1 according to the present embodiment includes an input interface section $1a$, a storage section $1b$, a disc information reading section $1c$, an AV output interface section $1d$, a network interface section $1e$, a display section $1f$ and a controlling section $1g$.

Each component of the reproduction device 1 according to the present embodiment may be configured by any hardware, software or a combination of hardware and software.

The reproduction device 1 according to the present embodiment receives an infrared signal transmitted in a wireless manner from the above-described remote controller at the input interface section $1a$ when the user presses, for example, a reproduction button, a numeric keypad and a selection button which are not illustrated of the above-described remote controller, for example.

When the user operates a button, which in not illustrated, on a remote controller, which is not illustrated, an infrared signal including request, such as a reproduction request of the content stored in the storage medium, an authentication request regarding whether the user is a registered user, a registration request for registering a user in the viewing history database and a retrieval request for retrieving a content database with an arbitrary search keyword selected by a user being specified, are input. The input interface section $1a$ A/D converts the input infrared signal and outputs a digital signal including the acquired reproduction request, the authentication request, the registration request and the retrieval request to the controlling section $1g$.

In the reproduction device 1 according to the present embodiment, the input interface section 1a may receive, in a wired or a wireless manner, an operation detecting signal output from the keyboard indicating that the key of the keyboard has been operated.

The reproduction device 1 according to the present embodiment may acquire the user ID by, for example, the controlling section 1g reading the user ID previously stored in the storage section 1b.

The reproduction device 1 according to the present embodiment may acquire the user ID by reading the user ID from a non-contact IC card which stores the user ID.

The storage section 1b is configured, for example, by a replaceable external storage device, such as a hard disk drive.

The storage section 1b stores the latest version of the retrieval application, transmitted from the application server device 2 via a network, which causes a retrieval screen that encourages an arbitrary retrieval stored in the storage medium to be displayed on a display screen of the display section 1f with the retrieval keyword being selected by the user.

The storage section 1b stores the data regarding the recording position at which the content including the data that matches the search keyword is recorded transmitted from the application server device 2 via a network, or a pair of data regarding a name of the storage medium which stores the content including the data that matches the search keyword and data regarding a name of a series to which the storage medium storing the content is recorded belongs.

The disc information reading section 1c reads an individual identification ID stored in the storage medium, information regarding connection to a network and data regarding the content and outputs the read individual identification ID, the information regarding connection to a network and the data of content to the controlling section 1g.

The AV output interface section 1d is an interface for outputting, to a display device, such as an externally-provided television monitor, image data and audio data obtained by performing related art processes including decoding to the data of the content read from the storage medium by the controlling section 1g.

The network interface section 1e is an interface which establishes a communication between the reproduction device 1 and the application server device 2 connected to the reproduction device 1 via a network. The network interface section 1e performs the following processes.

An authentication request transmission process is a process to receive an individual identification ID output from the controlling section 1g, the user ID individually allocated to each user and an authentication request for authenticating whether the user is a registered user, and then transmit the received individual identification ID, the user ID and the authentication request to the application server device 2 via a network.

An authentication result transmission process is a process to receive an authentication result transmitted from application server device 2 via a network regarding whether the user is a registered user and output the received authentication result to the controlling section 1g.

A registration request transmission process is a process to receive data regarding the user ID output from the controlling section 1g and a registration request for registering an unregistered user in the viewing history database and transmit the received data regarding the user ID and the registration request to the application server device 2 connected via the communication network.

A version data transmission process is a process to transmit data regarding a version of the retrieval application output from the controlling section 1g to the application server device 2 connected via a communication network.

An application update request transmission process is a process to transmit, to the application server device 2 connected via a communication network, an application update request for updating the version of the retrieval application to the latest version if the version of the retrieval application is not the latest version.

An application download process is a process to receive data regarding the retrieval application transmitted via a network from the application server device 2 and output the data regarding the received retrieval application to the controlling section 1g.

A retrieval request transmission process is a process to receive, from the controlling section 1g, the individual identification ID read from the storage medium, the user ID allocated to each user and input from outside through a user operation and a retrieval request for retrieving recorded content by specifying an arbitrary search keyword selected through a user operation and transmits the received individual identification ID, the user ID and the retrieval request via a network.

A recording position data transfer process is a process to receive, from the application server device 2, data regarding the recording position at which the content including the data that matches the search keyword transmitted via a network and output the received data regarding the recording position at which the content including the data that matches the search keyword is recorded to the controlling section 1g.

A series name data transfer process is a process to receive data regarding a name of the storage medium which stores the content including the data that matches the search keyword transmitted via a network and data regarding a name of a series to which the storage medium storing the content is recorded belongs transmitted from the application server device 2 and output the received data regarding a name of the storage medium which stores the content including the data that matches the search keyword and data regarding a name of a series to which the storage medium storing the content is recorded belongs to the controlling section 1g.

The display section 1f includes a display screen which displays a message relevant to the authentication result regarding whether the user is a registered user, a retrieval screen which encourages a user to arbitrarily retrieve all the content including the content stored in the storage medium, data regarding the recording position at which the content including the data that matches the search keyword is recorded selected by the user at the time of arbitrary retrieval of the content, data regarding a name of the storage medium which stores the content including the data that matches the search keyword and data regarding a name of a series to which the storage medium storing the content is recorded belongs.

The controlling section 1g is a processor which controls the entire reproduction device 1 according to the present embodiment and performs the following processes.

A content data output process is a process to output, to the AV output interface section 1d, image data and audio data acquired by performing related art processes including decoding to the data of the content output from the disc information reading section 1c.

An authentication request output process is a process to receive the individual identification ID output from the disc information reading section 1c, the user ID individually allocated to each user and output from the input interface section 1a and an authentication request for authenticating whether the user is a registered user, read data regarding a version of the retrieval application stored in the storage section 1b and outputs the received individual identification ID, the user ID, the authentication request and the data regarding the version of the retrieval application to the network interface section 1e.

If the authentication result received from the network interface section 1e indicates that the user who tries to access is a registered user, the authentication result display process causes a message indicating that authentication regarding whether the user is the registered user is completed to be displayed on the display screen of the display section 1f.

If the authentication result received from the network interface section 1e indicates that the user who tries to access is an unregistered user, a user ID registration promotion process causes a message indicating that the user is an unregistered user and encouraging user registration on a display screen of the display section 1f.

A registration request output process is a process to receive data regarding the user ID output from the input interface section 1a and a registration request for registering an unregistered user in the viewing history database and output the received data regarding the user ID and the registration request to the network interface section 1e.

An application update request output process is a process to output, to the network interface section 1e, an application update request for updating a version of the retrieval application to the latest version if the version of the retrieval application is not the latest version.

An application download process is a process to cause data of the retrieval application output from the network interface section 1e to be stored in the storage section 1b.

An application install process is a process to read data of the retrieval application from the storage section 1b, decompress the read data of the retrieval application, install the data in a computer of the reproduction device 1 so as to permit effective processes by the retrieval application.

A retrieval request output process is a process to output, to the network interface section 1e, the individual identification ID output from the disc information reading section 1c, the user ID allocated to each user and output from the input interface section 1a and a retrieval request for retrieving recorded content by specifying an arbitrary search keyword selected through a user operation.

A recording position data writing process is a process to receive data regarding the recording position at which the content including the data that matches the search keyword is recorded output from the network interface section 1e and cause the received data regarding the recording position at which the content including the data that matches the search keyword is recorded to be stored in the storage section 1b.

A recording position data display process is a process to receive data regarding the recording position at which the content including the data that matches the search keyword is recorded output from the network interface section 1e and cause the received data regarding the recording position at which the content including the data that matches the search keyword is recorded to be displayed on the display screen of the display section 1f.

A series name data writing process is a process to receive data regarding a name of the storage medium which stores the content including the data that matches the search keyword and data regarding a name of a series to which the storage medium storing the content is recorded belongs output from network interface section 1e and cause the received data regarding a name of the storage medium which stores the content including the data that matches the search keyword and the data regarding a name of a series to which the storage medium storing the content is recorded belongs to be stored in the storage section 1b.

A series name data display process is a process to receive data regarding a name of the storage medium which stores the content including the data that matches the search keyword and data regarding a name of a series to which the storage medium storing the content is recorded belongs output from the network interface section 1e and cause the received data regarding a name of the storage medium which stores the content including the data that matches the search keyword and the data regarding a name of a series to which the storage medium storing the content is recorded belongs to be displayed on the display screen of the display section 1f.

Configuration of Content Database Server Device 3

Next, a configuration of the content database server device 3 incorporated in the sales support system SS according to the present embodiment will be described.

The content database server device 3 according to the present embodiment includes an interface section 3a, a content database 3b and a database management system (DBMS) section 3c.

Each component of the content database server device 3 according to the present embodiment may be configured by any hardware, software or a combination of hardware and software.

The interface section 3a is an interface to establish communication between the content database server 3 and the application server device 2.

The content database 3b stores, in a mutually correlated manner, a content ID allocated to all the content, an individual identification ID allocated to a storage medium storing content, content specifying information including a name of the storage medium and a name of a series to which the storage medium storing the content belongs, meta data which is data regarding the content, data regarding a recording position of the content on the storage medium corresponding to the meta data, and a file of a retrieval application which causes a retrieval screen on which a user retrieves content relevant to the content stored in the storage medium to be displayed on a display unit incorporated in the reproduction device which is currently reproducing the content.

FIG. 5 is a schematic diagram illustrating an exemplary content database held by the content database server device 3 incorporated in the sales support system SS according to the present embodiment.

The content database 3b according to the present embodiment stores, in a mutually correlated manner, title information (a), content specifying information including series information (b), meta data (c), a content ID, PlayList information (d) and a file (GUI) (e) of a retrieval application. The title information (a) includes an individual identification ID allocated to the storage medium storing the content and a name of the storage medium storing the content. The content specifying information including series information (b) includes a name of a series to which the storage medium storing the content belongs. The meta data (c) is the data regarding the content. The content ID is allocated to the content corresponding to the meta data. The PlayList information (d) is the data regarding a recording position on the storage medium of the content. The file (GUI) (e) of a retrieval application causes a retrieval screen for making a user retrieve content relevant to the content stored in the storage medium to be displayed on a display screen incorporated in the reproduction device 1 currently reproducing the content.

The DBMS section 3c is a management system which manages data of the content database 3b and performs the following processes by installed software.

A version data return process is a process, when an inquiry regarding a version of the retrieval application installed to the reproduction device 1 and a content ID of a content being reproduced by the reproduction device 1 is received from the application server device 2, to retrieve the content database 3b using the received content ID as a search key, and, in accordance with the search result, transmits data regarding a version of the retrieval application corresponding to the acquired content ID to the application server device 2 via the interface section 3a.

An application reading process is a process to reads a retrieval application corresponding to the content ID from the content database 3b and transmits the read retrieval application to the application server device 2 via the interface section 3a when an application reading instruction for updating a version of the retrieval application installed in the reproduction device 1 transmitted from the application server device 2 to the latest version and a content ID of a content currently reproduced by the reproduction device are received from the interface section 3a.

A content data specifying process is a process to retrieve a content database 3b using an individual identification ID as a search key and then specifies, on the basis of the search result, entire data relating to a content ID individually allocated to the content stored in the storage medium, a name of a storage medium storing the content, a name of a series to which the content belongs and a recording position of the content if a first retrieval instruction for retrieving the content database 3b by using, as a search key, an individual identification ID transmitted from the application server device 2 is received from the interface section 3a.

A specific data output process is a process to transmit total data including a content ID individually allocated to a content stored in the storage medium specified by the content data specifying process, a name of the storage medium storing the content, the name of the series to which the content belongs and a recording position of the content to the application server device 2 via the interface section 3a.

Configuration of Viewing History Database Server Device 4

Next, a configuration of the viewing history database server device 4 incorporated in the sales support system SS according to the present embodiment will be described.

The viewing history database server device 4 according to the present embodiment includes a interface section 4a, a viewing history database 4b and a database management system (DBMS) section 4c.

Each component of the viewing history database server device 4 according to the present embodiment may be configured by any hardware, software or a combination of hardware and software.

The interface section 4a is an interface to establish communication between the viewing history database server device 4 and the application server device 2.

The viewing history database 4b stores a user ID, an individual identification ID, a name of a storage medium, a content ID and viewing history-relevant information in a collated manner. The user ID is allocated to each user. The individual identification ID is allocated to a storage medium held by the user. The storage medium stores at least one content. The content ID is individually allocated to the content stored in the storage medium. The viewing history-relevant information includes viewing time in which the user corresponding to the user ID viewed the content.

FIG. 6 is a schematic diagram illustrating an exemplary viewing history database 4b held by the viewing history database server device 4 incorporated in the sales support system SS according to the present embodiment.

The viewing history database 4b according to the present embodiment stores, in a mutually correlated manner, user information (p) which is an user ID allocated to each user, an individual identification ID allocated to a storage medium held by the user, title information (q) including a name of the storage medium corresponding to the individual identification ID and a viewing log information (r) which is viewing history-relevant information including a viewing time during which the user corresponding to each user ID viewed the content corresponding to each content ID.

The DBMS section 4c is a management system which manages data of the viewing history database 4b and performs the following processes by installed software.

An user ID collation process is a process to collate whether a received user ID is stored in the viewing history database 4b if an inquiry for performing collation regarding whether an user ID received from the reproduction device 1 currently reproducing is stored in the viewing history database 4b is received from the interface section 4a.

An user ID collation result responding process is a process to transmit an acquired collation result obtained from the above-described user ID collation process to the application server device 2 via the interface section 4a.

The user registration process is a process to allocate, as an user ID corresponding to the user, an user ID received from the reproduction device 1 to a pair of an individual identification ID allocated to the storage medium storing the content held by the user received from the reproduction device 1 and data of a name of the recording medium, if a user registration instruction to be stored in the viewing history database 4b store is received from the application server device 2, allocate the received user ID to a pair of the data of the name of the storage medium storing the content held by the user transmitted from the reproduction device 1 and the individual identification ID allocated to the storage medium transmitted from the reproduction device 1 and storing the user ID in the viewing history database 4b so as to update the data in the viewing history database 4b.

The user registration process executed by the viewing history database server device 4 according to the present embodiment may be a process to allocate, as a user ID corresponding to the user, a user ID including an arbitrary character string which is not stored in the viewing history database 4b and input through a user operation to a pair of the data of the name of the storage medium storing the content held by the user transmitted from the reproduction device 1 and an individual identification ID allocated to the storage medium transmitted from the reproduction device 1 and stores the user ID in the viewing history database 4b store so as to update the data in the viewing history database 4b.

When a second retrieval instruction for retrieving the viewing history database 4b by using, as search key, a content ID allocated to the content including the data that matches the search keyword is received from the application server device 2, a second search result output process retrieves the viewing history database 4b by using, as a search key, the received content ID and transmits data of all the obtained viewing histories to the application server device 2 via the interface section 4a as a result of the retrieval.

Configuration of Application Server Device 2

Next, a configuration of the application server device 2 incorporated in the sales support system SS according to the present embodiment will be described.

The application server device 2 according to the present embodiment includes a network interface section 2a, an application executing section 2b and an interface section 2c.

Each component of the application server device 2 according to the present embodiment may be configured by any hardware, software or a combination of hardware and software.

The network interface section 2a is an interface for establishing a communication between the application server device 2 and the reproduction device 1. The reproduction device 1 is connected to the application server device 2 via the application server device 2 and a network. The network interface section 2a performs the following processes.

The application executing section 2b is a processor which controls the entire application server device 2 and performs the following processes with a server side application installed.

In a user ID inquiry process, when a user ID received from the reproduction device 1 currently reproducing and an authentication request for making a collation regarding whether the received user ID is stored in the viewing history database has been received from the interface section, an inquiry regarding whether the user registration has been made is transmitted to the viewing history database server device 4.

An authentication process is a process to receive a collation result regarding whether the user ID which is transmitted from the viewing history database server device 4 and is received from the reproduction device 1 currently reproducing has been stored in the viewing history database 4b via the interface section 2c and authenticate whether the user who tries to access is a registered user in accordance with the received collation result.

A user ID transmission request transmission process is a process to transmit a user ID transmission request for encouraging an user to input an user ID to the reproduction device 1 via the network interface section 2a when the user who tries to access is found to be an unregistered user in accordance with the authentication.

When the user ID input from the reproduction device 1 and the registration request for encouraging an unregistered user to register in the viewing history database 4b are received from the reproduction device 1, the user registration instruction output process allocates a user ID received from the reproduction device 1 to a pair of individual identification ID allocated to the storage medium storing the content held by the user received from the reproduction device 1 and data of a name of the recording medium, and transmits the user registration instruction to be stored in the viewing history database 4b to the viewing history database server device 4 via the interface section 2c.

A version inquiry output process is a process to transmit an inquiry about the latest version of retrieval application received from the reproduction device 1 and a content ID received from the reproduction device 1 to the content database server device 3.

A version determination process is, if the user who tries to access is found to be a registered user as a result of authentication at the authentication process, to compare data regarding the version of the retrieval application received from the reproduction device 1 via the network and the version of the retrieval application stored in the content database 3b if the user registration process of the unregistered user in the viewing history database 4b is completed, and to determine whether the version of the retrieval application installed in the reproduction device 1 is the latest version.

As a result of the determination of the version determination process, if the data of the version of the retrieval application received from the reproduction device 1 via the network is not the latest version, an application reading instruction output process notifies the fact to the reproduction device 1. If an application update request is received from the reproduction device 1, the application reading instruction output process transmits an application reading instruction for reading a retrieval application of the latest version and the content ID received from the reproduction device 1 to the content database server device 3 via the interface section 2c.

An application output process receives, from the interface section 2c, data of the retrieval application output from the content database server device 3 and transmits the received data of the retrieval application to the reproduction device 1 via the network interface section 2a.

After the data of the retrieval application is updated, a first retrieval instruction output process transmits a first retrieval instruction for retrieving a content database by using an individual identification ID as a search key to the content database server device 3 via the interface section 2c if an individual identification ID allocated to the storage medium, an arbitrary search keyword selected by the user and a retrieval request for retrieving the content database are received from the network interface section 2a.

On the basis of the search result in the content data server device 3, a recording position data extraction process receives total data including a content ID allocated individually to the content stored in the specified storage medium, a name of a storage medium storing the content, the name of the series to which the content belongs and a recording position of the content from the interface section 2c, extracts information about the recording position on the storage medium storing the data corresponding to the search keyword from the total data regarding the content ID received from the interface section 2c, a name of the storage medium storing the content and the name of the series to which the content belongs.

The second retrieval instruction output process is a process to transmit the second retrieval instruction for retrieving viewing history database 4b to the viewing history database server device 4 via the interface section 2c using the content ID allocated to the content including the data that matches the search keyword as a search key.

The viewing history existence determination process is a process to receive the acquired data from the interface section 2c on the basis of the result of the retrieval of the viewing history database 4b using the content ID allocated to the content including the data that matches the search keyword as a search key and determine whether the content including the data that matches the search keyword is stored in the viewing history database 4b on the basis of the received data.

As a result of the determination by the viewing history existence determination process, if the content including the data that matches the search keyword is registered in the viewing history database 4b, a recording position data output process transmits data regarding the recording position at which the content including the data that matches the search keyword is recorded extracted by the above-described recording position data extraction process to the reproduction device 1 via the network interface section 2a.

As a result of the determination by the viewing history existence determination process, if the content including the data that matches the search keyword is not registered in the viewing history database 4b, a series name data output process transmits data regarding a name of the storage medium which stores the content including the data that matches the search keyword extracted by the above-described recording position data extraction process and data regarding a name of a series to which the storage medium storing the content is recorded belongs to the reproduction device 1 via the network interface section 2a.

An interface section 2c is an interface for making a communication between the application server device 2, the content database server device 3 and the viewing history database server device 4 which were connected to the application server device 2 via the LAN and the WAN.

Execution Process of Sales Support System SS

Next, an execution process of the thus-configured sales support system SS will be described with reference to the drawings.

Figure 7:
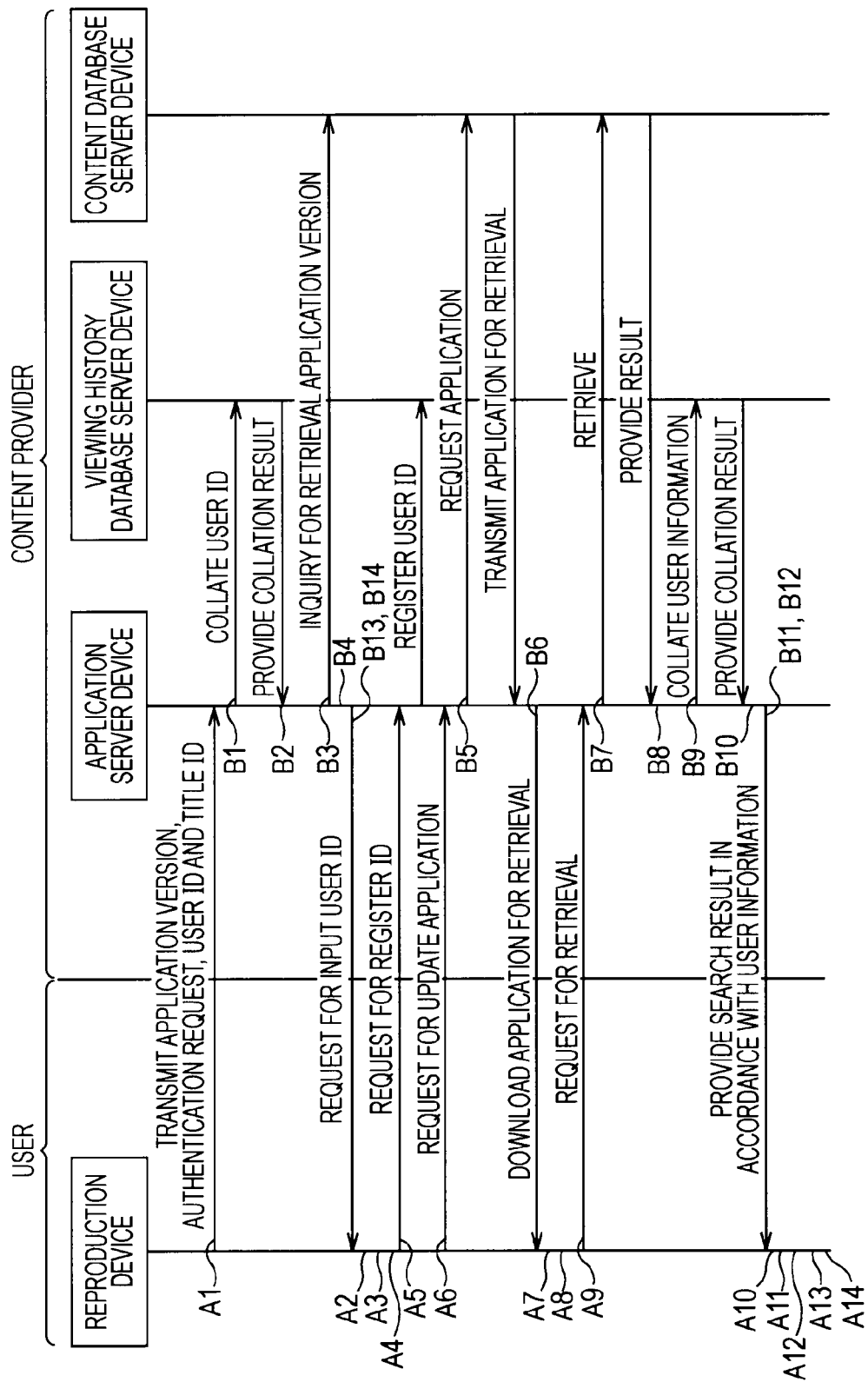
FIG. 7 is a sequence chart illustrating an execution process executed by the sales support system SS according to the embodiment.

FIG. 7 is a sequence chart illustrating the execution process of the sales support system SS according to the present embodiment.

The following description illustrates only important points of the invention. For the ease of illustration, only an embodiment in which an authentication request has been transmitted to the sales support system SS according to the present embodiment from the reproduction device 1 owned by a specified user A among plural reproduction devices 1 connected to the sales support system SS via a network. However, the processes executed when the authentication request is transmitted from the reproduction device 1 owned by the user A which will be described herein may be similarly applied to an embodiment in which an authentication request is transmitted from a reproduction device owned by another user B.

The reproduction device incorporated in the sales support system SS according to the present embodiment in a state in which the storage medium storing content data is placed in a disc tray, which is not illustrated, which can be opened and closed using a remote controller, which is not shown, when a reproduction operation of the content in the storage medium is made using, for example, the remote controller, a program installed in the computer of the reproduction device 1 starts to execute the reproduction process of the content included in the storage medium, and the following processes will be performed.

Execution Process at the side of the Reproduction Device 1: STA

Figure 8:
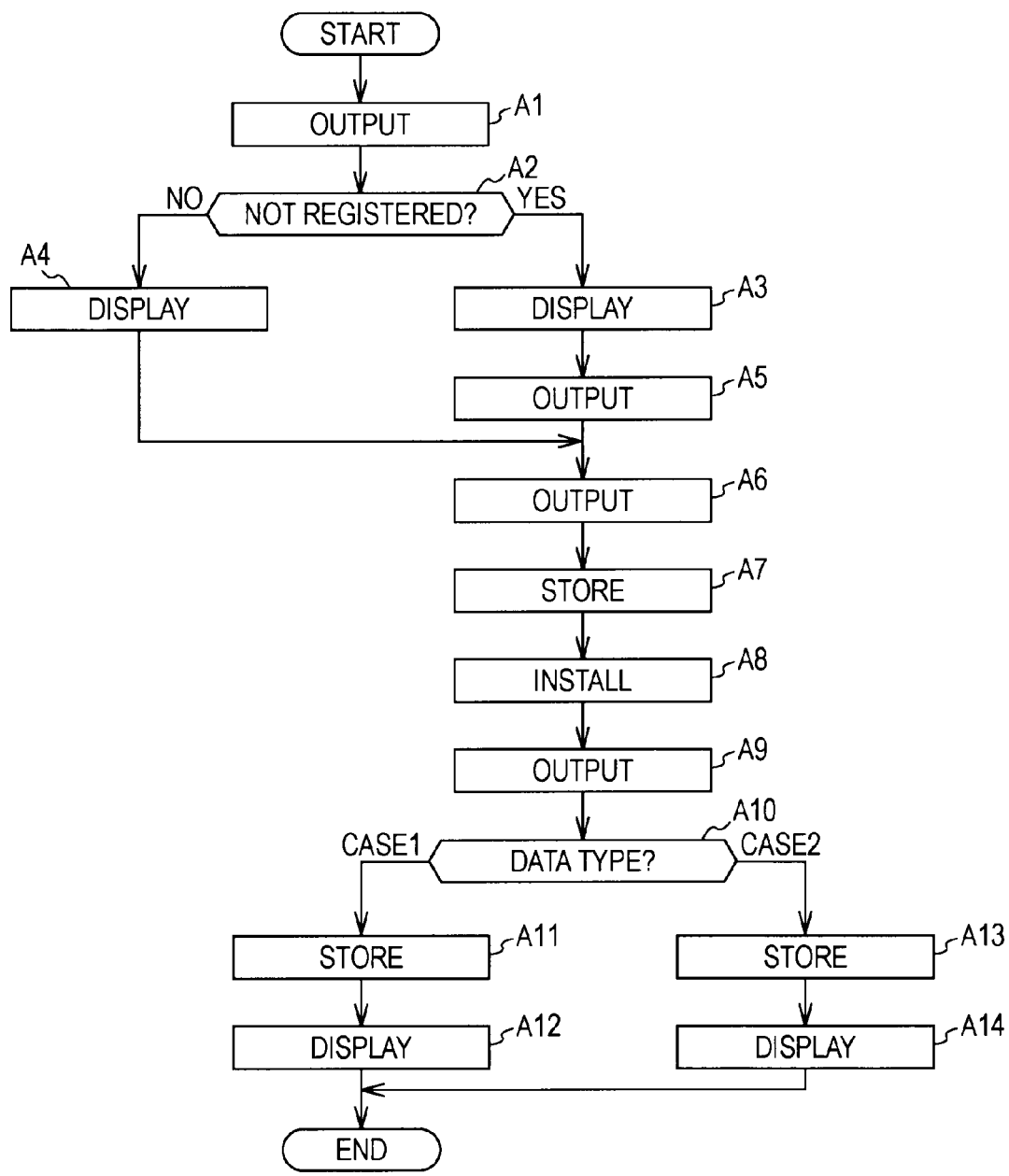
FIG. 8 is a flowchart illustrating an execution process executed by a reproduction device 1 incorporated in the sales support system SS according to the embodiment.

FIG. 8 is a flowchart illustrating an execution process of the reproduction device 1 incorporated in the sales support system SS according to the present embodiment.

First, the controlling section 1g receives an individual identification ID output from the disc information reading section 1c, a user ID individually allocated to each user and output from the input interface section 1a and an authentication request for authenticating whether the user is a registered user. The controlling section 1g then reads data regarding a version of the retrieval application stored in the storage section 1b and transmits the received individual identification ID, the user ID, the authentication request and the data regarding the version of the retrieval application to the application server device 2 via the network interface section 1e (A1).

Next, the controlling section 1g determines whether the authentication result received from the network interface section 1e indicates that the user who tries to access is an unregistered user on the basis of whether the user ID transmission request has been received from the network interface section 1e (A2).

If the authentication result received from the network interface section 1e indicates that the user who tries to access is a registered user (A2: No), the controlling section 1g causes a message indicating that the authentication regarding whether the user is a registered user is completed to be displayed on the display screen of the display section 1f (A3).

If the authentication result received from the network interface section 1e indicates that the user who tries to access is an unregistered user (A2: Yes), the controlling section 1g causes a message indicating that the user is an unregistered user and encouraging user registration to be displayed on the display screen of the display section 1f (A4).

Next, the controlling section 1g receives data of the user ID output from the input interface section 1a and a registration request for encouraging an unregistered user to register in the viewing history database, and transmits the received user ID data and the registration request to the application server device 2 via the network interface section 1e (A5).

Next, if the controlling section 1g receives notification that the version of the retrieval application is not the latest version, the controlling section 1g transmits an application update request for updating the version of the retrieval application to the latest version to the application server device 2 via the network interface section 1e (A6).

Next, the controlling section 1g causes the data of retrieval application output from network interface section 1e to be stored in the storage section 1b (A7).

Next, the controlling section 1g reads the data of the retrieval application from the storage section 1b and decompressed the data of the read retrieval application, and then installs the decompressed data in a computer of the reproduction device 1 to allow an effective process to be conducted by the retrieval application (A8).

Next, the controlling section 1g transmits, to the application server device 2 via network interface section (A9), the individual identification ID output from the disc information reading section 1c, the user ID allocated to each user and output from the interface section and a retrieval request for retrieving the registered content by specifying an arbitrary search keyword selected by the user operation.

Next, if the data regarding the recording position at which the content including the data that matches the search keyword is recorded output from network interface section 1e is received (A10:Case1), the controlling section 1g causes the data regarding the recording position at which the content including the data that matches the search keyword is recorded to be stored in the storage section 1b (A11).

Next, the controlling section 1g reads the data regarding the recording position at which the content including the data that matches the search keyword is recorded from the storage section 1b and causes the data regarding the recording position at which the content including the data that matches the search keyword is recorded to be displayed on a display screen of the display section 1f (A12). For example, if user A searches with a search keyword "player A goal scene" being selected, a Playlist1 corresponds to a candidate from the content of the meta data stored in the content database 3b. If the storage medium storing the content is stored in the viewing history database, data regarding a stored position on the storage medium storing the Playlist1 is displayed on a display screen of the display section 1f incorporated in the reproduction device 1.

If the data regarding a name of the storage medium which stores the content including the data that matches the search keyword output from the network interface section 1e and the data regarding a name of a series to which the storage medium storing the content is recorded belongs is received (A10: Case2), the controlling section 1g causes the data regarding a name of the storage medium which stores the content including the data that matches the received search keyword and the data regarding a name of a series to which the storage medium storing the content is recorded belongs to be stored in the storing section 1b (A13).

Next, the controlling section 1g reads the data regarding a name of the storage medium which stores the content including the data that matches the search keyword and data regarding a name of a series to which the storage medium storing the content is recorded belongs from the storage section 1*b* and causes the read data regarding a name of the storage medium which stores the content including the data that matches the search keyword and the data regarding a name of a series to which the storage medium storing the content is recorded belongs to be displayed on the display screen of the display section 1*f* (A14). For example, if a user A searches with a search keyword "100th goal scene of the J. League," since the storage medium with which the 100th goal scene of the J. League is recorded in the storage medium corresponding to a title c of the content database 3*b* and no storage medium storing the content is stored in the viewing history database, a message of "the scene you are trying to see is in the disc no. xx-xxxx-xx. Ask for it in a nearby CD/DVD shop or xx." for example, is displayed on a display screen of the display section 1*f* of the reproduction device 1.

With the foregoing series of processes, the reproduction device 1 incorporated in the sales support system SS according to the present embodiment completes the execution process.

Execution Process at the Side of Application Server Device 2: STB

When the user ID and the authentication request for performing collation regarding whether the received user ID is stored in the viewing history database are received from the reproduction device 1, a server side application installed in the application server device 2 starts and the started server side application executes the following procedures.

FIG. 9 is a flowchart illustrating an execution process of the application server device 2 incorporated in the sales support system SS according to the present embodiment.

When a user ID is received from the reproduction device 1 which is currently reproducing the content and a authentication request is received from the interface section for determining whether the received user ID is stored in the viewing history database, the application executing section 2*b* transmits an inquiry regarding whether user registration has been made to the viewing history database server device 4 via the interface section 2*c* (B1).

Next, the application executing section 2*b* receives, from the viewing history database server device 4 via the interface section, the collation result regarding whether the user ID allocated to each user and received from the reproduction device 1 which is currently reproducing has been stored in the viewing history database. Then, application executing section 2*b* authenticates whether the user who tries to access has been registered in accordance with the received collation result (B-2).

When the user who tries to access is found to be a registered user in accordance with the authentication of the authentication process (B-2: Case1), the application executing section 2*b* outputs an inquiry about the latest version of the retrieval application received from the reproduction device 1, the content ID received from the reproduction device 1 to the content database server device 3 via the interface section 2*c* (B3).

Next, the application executing section 2*b* compares the version data of the retrieval application received from the reproduction device 1 via the network and the version of the retrieval application stored in the content database so as to determine whether the version of the retrieval application installed in the reproduction device 1 is the latest version (B4).

As a result of the determination of the version determination process, the application executing section 2*b* performs the following process in B7 if the version data of the retrieval application received from the reproduction device 1 via the network is the latest version (B4:Yes).

As a result of the determination of the version determination process, if the version data of the retrieval application received from the reproduction device 1 via the network is not the latest version (B4:No), the application executing section 2*b* notifies the reproduction device 1 that the version of retrieval application is not the latest version. When the application executing section 2*b* receives an application reading instruction from the reproduction device 1, the application executing section 2*b* transmits an application reading instruction to read the latest version retrieval application and the content ID received from the reproduction device 1 to the content database server device 3 via the interface section 2*c* (B5).

Next, the application executing section 2*b* receives the data of the retrieval application from the interface section and transmits the received data of the retrieval application to the reproduction device 1 via the network interface section 2*a* (B6).

Thus, the version of the retrieval application of the sales support system SS according to the present embodiment is updated to the latest version.

Next, if the individual identification ID allocated to the storage medium, an arbitrary search keyword selected by the user and a retrieval request for retrieving the content database 3*b* are received from the network interface section 2*a* after the data of the retrieval application installed in the reproduction device 1 is updated, the application executing section 2*b* transmits the first retrieval instruction for retrieving the content database to the content database server device 3 via interface section 2*c* (B7) with the individual identification ID being a search key.

Next, in response to the result of retrieval made by content data server device 3, the application executing section 2*b* receives the content ID individually allocated to the content stored in the specified storage medium, a name of the storage medium storing the content, a name of the series to which the content belongs and the total data regarding the recording position of each content from the interface section 2*c*, and then extract, among the information about the received content ID, the name of the storage medium storing the content, and the name of the series to which the content belongs, information regarding a recording position on the storage medium storing the data corresponding to the search keyword (B8).

Next, the application executing section 2*b* transmits the second retrieval instruction for retrieving viewing history database 4*b* using the content ID allocated to the content including the data that matches the search keyword as a search key to the viewing history database server device 4 via the interface section 2*c* (B9).

Next, as a result of retrieval of the viewing history database 4*b* with the content ID allocated to the content including the data corresponding to the search keyword as search key, the application executing section 2*b* receives the acquired data from the interface section 2*c* and determines whether the content including the data that matches the search keyword is stored in the viewing history database 4*b* on the basis of the received data (B10).

As a result of the determination, if it is found that the content including the data that matches the search keyword is registered in the viewing history database (B10: Yes), the application executing section 2*b* transmits data regarding the recording position at which the content including the data that matches the search keyword is recorded to the reproduction device 1 via the network interface section 2*a* (B11).

As a result of the determination, if it is found that the content including the data that matches the search keyword is not registered in the viewing history database 4b (B10:No), the application executing section 2b transmits data regarding a name of the storage medium which stores the content including the data that matches the search keyword and data regarding a name of a series to which the storage medium storing the content is recorded belongs to the reproduction device 1 via the network interface section 2a (B12).

When it is found that the user who tries to access is a unregistered user (B-2: Case2) in accordance with the authentication, the application executing section 2b transmits a user ID transmission request to encourage the user to register the user ID in the viewing history database transmitted to the reproduction device 1 via the network interface section 2a (B13).

When the data of the user ID and a registration request for registering the unregistered user in the viewing history database 4b are received, the application executing section 2b allocates a user ID corresponding to the user to a pair of the data of the name of the storage medium storing the content held by the user transmitted from the reproduction device 1 and an individual identification ID allocated to storage medium transmitted from the reproduction device 1. After the user registration instruction for causing the viewing history database 4b to be stored in the viewing history database server device 4 is transmit via the interface section 2c (B14), the routine proceeds to step B3.

If it is found that the user who tries to access is not a registered user in accordance with the authentication, a user ID corresponding to the user is allocated to a pair of the data of the name of the storage medium storing the content held by the user transmitted from the reproduction device 1 and individual identification ID allocated to the storage medium transmitted from the reproduction device 1 and then stores the user ID in the viewing history database 4b. In this manner, the data in the viewing history database 4b is updated.

In the application server device 2 incorporated in the sales support system SS according to the present embodiment, if it is found that the user who tries to access is not a registered user in accordance with the authentication, a user ID which includes an arbitrary character string and is not stored in the viewing history database and is input by the user operation is allocated to a pair of the data of the name of the storage medium storing the content held by the user transmitted from the reproduction device 1 and the individual identification ID allocated to the storage medium transmitted from the reproduction device 1 as a user ID corresponding to the user and then stored in the viewing history database 4b so as to update the data of the viewing history database 4b.

As described above, in the present embodiment, if the content including the data that matches the search keyword is registered in the viewing history database 4b, data regarding the recording position at which the content including the data that matches the search keyword is recorded is transmitted to the reproduction device 1.

In the present embodiment, if the content including the data that matches the search keyword is not registered in the viewing history database 4b, data regarding a name of the storage medium which stores the content including the data that matches the search keyword and data regarding a name of a series to which the storage medium storing the content is recorded belongs are transmitted to the reproduction device 1.

With this configuration, according to the present embodiment, since it is possible to directly transmit the name of the storage medium storing the content the user does not have including the content that matches the search keyword and the name of the series to which the content belongs to the user of the reproduction device 1, customer satisfaction of the user who owns the reproduction device 1 can be improved and therefore a purchasing interest of the user can be stimulated.

According to the present embodiment, the retrieval application for making a search of the content stored in the storage medium is updated as necessary and provided to the user who owns the storage medium, customer satisfaction can be improved and a purchasing interest of the user can be stimulated.

According to the present embodiment, it is also possible to directly send a guide of other articles from the content provider to highly potential customers.

According to the present embodiment, if the work includes several volumes or the work is a series of content, the user can retrieve over the plural volumes using the content database of the content provider. If a scene the user may want to see is stored in another storage medium owned by the user, the user is encouraged to see the scene. If the desired scene is not stored in the storage medium owned by the user, the user can be notified with other works stored in the storage medium.

According to the present embodiment, since the content provider can directly provide article guides to highly potential customers, the advertising efficiency can be increased significantly and thus sales probability can be significantly increased.

According to the present embodiment, when a user tries to access a server device, a viewing log is taken at that time. Thus, the content provider can grasp which portion of the sold work is most viewed by the user. It is therefore becomes possible to utilize the result in a future work and to make efficiently produce works that can increase use of the user.

The present embodiment may be applied to sport documentaries. Similar works may be issued every season to establish a library. In this manner, it is possible to continuously stimulate purchasing interests of users.

Modified Embodiment

It is to be understood that the above described embodiment of the invention is illustrative only and various modifications may be made in practice without departing from the spirit and scope of the invention. The embodiment in the foregoing description includes inventions at various stages and therefore various inventions may be made by proper combinations of plural components disclosed. For example, if an invention is made by omitting some components from the total components of the described embodiment, the omitted components may be compensated for with related art components in practice.

The invention may be modified in a various manner without departing from the spirit and scope of the invention. For example, the content database server device 3, the viewing history database server device 4 and the application server device 2 according to the present embodiment may be configured as a single application server device which has a content database and a viewing history database.

Although the application server device 2 is connected to the content database server device 3 and the viewing history database server device 4 according to the present embodiment via a LAN or a WAN in the foregoing description, remote server devices may be connected via the Internet. The viewing history database held by the viewing history database server device 4 according to the present embodiment may further store data regarding the number of viewing of the content. In the application server device 2 according to the present embodiment, if the number of series is large and the meta data is huge in volume, it is not necessary to transmit the data from the content database server device 3 to the application server device 2, or only data regarding representative meta data may be transmitted to the application server device 2 from the content database server device 3. In the application server device 2 according to the present embodiment, only data relating representative meta data may be transmitted to the application server device 2 from the content database server device 3 and may be retrieved with free words from the reproduction device 1 side regarding the transmitted data.

Note that the sales support system according to the present embodiment may be applied to any content of wide-ranging user favorite, including movie series and television dramas, as well as sport documentary, automobiles, railroads, scenery of world heritages and encyclopedia so long as a plenty of meta data relating to recorded content (e.g., places, times, persons, meanings and specifications) and a plenty of slightly different similar content which may increase continuously exist.

The present application contains subject matter related to that disclosed in Japanese Priority Patent Application JP 2008-286891 filed in the Japan Patent Office on Nov. 7, 2008, the entire content of which is hereby incorporated by reference.

It is to be understood that the foregoing description of the embodiment of the invention is illustrative only and that various modification may be made without departing from the spirit and scope of the invention.

What is claimed is:

1. A sales support system comprising:
a content database which stores, in a mutually correlated manner, a content ID individually allocated to all content, an individual identification ID allocated to a storage medium storing content, a name of the storage medium, content specifying information which includes a name of a series to which the storage medium belongs, meta data which is data relating the content, data regarding a recording position of the content on the storage medium corresponding to the meta data and a file of a retrieval application which causes a retrieval screen on which a user retrieves content relevant to the content stored in the storage medium to be displayed on a display unit of a reproduction device that is currently reproducing the content;
a viewing history database storing, in a mutually correlated manner, a user ID allocated to each user, an individual identification ID allocated to a storage medium owned by the user, the name of the storage medium storing at least one content, a content ID individually allocated to content included in the storage medium, and viewing history-relevant information including a viewing time during which the user corresponding to the user ID viewed the content;
an authentication unit configured to authenticate whether the user who tries to access is a registered user by determining whether a user ID transmitted from the reproduction device that is currently reproducing the content is stored in the viewing history database;
an application updating unit configured to update data of the retrieval application by transmitting the latest version of the retrieval application to the reproduction device, when the user who tries to access is found to be a registered user in accordance with the authentication by the authentication unit and if the version of the retrieval application installed in the reproduction device is not the latest version;
a storage medium storing content specifying unit configured to specify, after the application updating unit updated the data, an individual identification ID allocated to the storage medium, an arbitrary search keyword selected by the user, a content ID individually allocated to content stored in the storage medium in accordance with a retrieval result if a retrieval request for retrieving the content database is received from the reproduction device, the content database is retrieved with the individual identification ID being used as a search key, the name of the storage medium storing the content and the name of the series to which the content belongs;
a recording position information extraction unit configured to extract, from total data of the content specified by the storage medium storing content specifying unit, information about a recording position on the storage medium storing the data corresponding to the search keyword;
a corresponding content existence determination unit configured to determine whether the content including the data that matches the search keyword is stored in the viewing history database by retrieving the viewing history database by using, as a search key, the content ID allocated to the content including the data that matches the search keyword;
a recording position data transmission unit configured to transmit data regarding the recording position at which the content including the data that matches the search keyword is recorded to the reproduction device if the content including the data that matches the search keyword is found to be registered in the viewing history database in accordance with determination by the corresponding content existence determination unit; and
a recorded content relevant data transmission unit configured to transmit data regarding the name of the storage medium which stores the content including the data that matches the search keyword and data regarding the name of a series to which the storage medium storing the content is recorded belongs to the reproduction device if the content including the data that matches the search keyword is not found to be registered in the viewing history database in accordance with the determination by the corresponding content existence determination unit.

2. The sales support system according to claim 1, further comprising a data updating unit configured to, when it is found that the user who tries to access is not a registered user in accordance with the authentication at the authentication procedure, update data in the viewing history database by allocating a user ID corresponding to the user to a pair of data of the name of the storage medium storing the content owned by the user transmitted from the reproduction device and an individual identification ID allocated to the storage medium transmitted from the reproduction device, and storing the user ID in the viewing history database.

3. The sales support system according to claim 1, further comprising a data updating unit configured to, when it is found that the user who tries to access is not a registered user in accordance with the authentication at the authentication procedure, data in the viewing history database by allocating, as a user ID corresponding to the user, a user ID including an arbitrary text string, which is not stored in the viewing history database and thus input by a user, to a pair of the data of the name of the storage medium storing the content owned by the user transmitted from the reproduction device and the individual identification ID allocated to the storage medium transmitted from the reproduction device, and storing the user ID in the viewing history database.

4. A sales support system according to any one of claims 1 to 3, further comprising a reproduction device, which includes:
- an identification ID reading unit configured to read the individual identification ID from the storage medium if arbitrary content in a storage medium which at least stores an individual identification ID inherent to the storage medium and reproducible content is reproduced by a user;
- a retrieval request transmission unit configured to transmit, via a network, an individual identification ID read by the identification ID reading unit, a user ID allocated to each user and input by a user from outside and a retrieval request for retrieving the recorded content by specifying an arbitrary search keyword selected by the user;
- a display unit configured to display a retrieval screen which encourages a user to arbitrarily retrieve all the content including the content stored in the storage medium, data regarding the recording position at which the content including the data that matches the search keyword is recorded, and data regarding a name of the storage medium which stores the content including the data that matches the search keyword and data regarding a name of a series to which the storage medium storing the content is recorded belongs; and
- a display control unit configured to display, on the display unit, a retrieval screen which encourages to arbitrarily retrieve arbitrary content including the content stored in the storage medium, data regarding the recording position at which the content including the data that matches the search keyword is recorded if the content including the data that matches the search keyword is registered in the viewing history database, data regarding the name of the storage medium which stores the content including the data that matches the search keyword if the content including the data that matches the search keyword is not registered in the viewing history database, and data regarding the name of a series to which the storage medium storing the content is recorded belongs.

5. A sales support method comprising the steps of:
authenticating whether the user who tries to access is a registered user by determining whether a user ID transmitted from the reproduction device that is currently reproducing the content is stored in a viewing history database storing, in a mutually correlated manner, a user ID allocated to each user, an individual identification ID allocated to a storage medium owned by the user, a name of the storage medium storing at least one content, a content ID individually allocated to content included in the storage medium, and viewing history-relevant information including a viewing time during which the user corresponding to the user ID viewed the content;
updating an application to update data of the retrieval application by transmitting the latest version of the retrieval application to the reproduction device, when the user who tries to access is found to be a registered user in accordance with the authentication at the step of authenticating and if the version of the retrieval application installed in the reproduction device is not the latest version;
specifying, after the step of updating the application to update data, content held by the storage medium by, when an individual identification ID allocated to the storage medium, an arbitrary search keyword selected by the user and a retrieval request for retrieving the content database are received from the reproduction device, retrieving a content database storing, in a mutually correlated manner, content specifying information including a content ID allocated to all the content with the individual identification ID being a search key, an individual identification ID allocated to the storage medium storing the content, the name of the storage medium and the name of a series to which the storage medium storing the content belongs, meta data which is data regarding the content, data regarding a recording position of the content on the storage medium corresponding to the meta data, a file of a retrieval application which causes a retrieval screen on which a user retrieves content relevant to the content stored in the storage medium to be displayed on a display unit of a reproduction device that is currently reproducing the content, and specifying a content ID individually allocated to content stored in the storage medium in accordance with a retrieval result, the name of the storage medium storing the content and the name of the series to which the content belongs;
extracting a recording position information, from total data of the content specified at the storage medium storing content specifying step, information about a recording position on the storage medium storing the data corresponding to the search keyword;
determining a corresponding content existence to determine whether the content including the data that matches the search keyword is stored in the viewing history database by retrieving the viewing history database by using, as a search key, the content ID allocated to the content including the data that matches the search keyword;
transmitting a recording position data to transmit data regarding the recording position at which the content including the data that matches the search keyword is recorded to the reproduction device if the content including the data that matches the search keyword is found to be registered in the viewing history database in accordance with determination at the step of determining the corresponding content existence; and
transmitting a recorded content relevant data to transmit data regarding the name of the storage medium which stores the content including the data that matches the search keyword and data regarding the name of a series to which the storage medium storing the content is recorded belongs to the reproduction device if the content including the data that matches the search keyword is not found to be registered in the viewing history database in accordance with the determination at the step for determining the corresponding content existence.

6. A non-transitory computer readable medium including a sales support program which causes a computer of the application server device the procedures of:
authenticating whether the user who tries to access is a registered user by determining whether a user ID transmitted from the reproduction device that is currently reproducing the content is stored in a viewing history database storing, in a mutually correlated manner, a user ID allocated to each user, an individual identification ID allocated to a storage medium owned by the user, a name of the storage medium storing at least one content, a content ID individually allocated to content included in the storage medium, and viewing history-relevant information including a viewing time during which the user corresponding to the user ID viewed the content;
updating an application to update data of the retrieval application by transmitting the latest version of the retrieval application to the reproduction device, when the user who tries to access is found to be a registered user in accordance with the authentication at the procedure of authenticating and if the version of the retrieval application installed in the reproduction device is not the latest version;

specifying, after the procedure of updating the application to update data, content held by the storage medium by, when an individual identification ID allocated to the storage medium, an arbitrary search keyword selected by the user and a retrieval request for retrieving the content database are received from the reproduction device, retrieving a content database storing, in a mutually correlated manner, content specifying information including a content ID allocated to all the content with the individual identification ID being a search key, an individual identification ID allocated to the storage medium storing the content, the name of the storage medium and a name of a series to which the storage medium storing the content belongs, meta data which is data regarding the content, data regarding a recording position of the content on the storage medium corresponding to the meta data, a file of a retrieval application which causes a retrieval screen on which a user retrieves content relevant to the content stored in the storage medium to be displayed on a display unit of a reproduction device that is currently reproducing the content, and specifying a content ID individually allocated to content stored in the storage medium in accordance with a retrieval result, the name of the storage medium storing the content and the name of the series to which the content belongs;

extracting a recording position information, from total data of the content specified at the storage medium storing content specifying procedure, information about a recording position on the storage medium storing the data corresponding to the search keyword;

determining a corresponding content existence to determine whether the content including the data that matches the search keyword is stored in the viewing history database by retrieving the viewing history database by using, as a search key, the content ID allocated to the content including the data that matches the search keyword;

transmitting a recording position data to transmit data regarding the recording position at which the content including the data that matches the search keyword is recorded to the reproduction device if the content including the data that matches the search keyword is found to be registered in the viewing history database in accordance with determination at the procedure of determining the corresponding content existence; and transmitting a recorded content relevant data to transmit data regarding the name of the storage medium which stores the content including the data that matches the search keyword and data regarding the name of a series to which the storage medium storing the content is recorded belongs to the reproduction device if the content including the data that matches the search keyword is not found to be registered in the viewing history database in accordance with the determination at the procedure for determining the corresponding content existence.

7. The non-transitory computer readable medium including the sales support program according to claim 6, wherein, when it is found that the user who tries to access is not a registered user in accordance with the authentication at the authentication procedure, the program causes a computer of the application server device to further execute a data update procedure to update data in the viewing history database by allocating a user ID corresponding to the user to a pair of data of the name of the storage medium storing the content owned by the user transmitted from the reproduction device and an individual identification ID allocated to the storage medium transmitted from the reproduction device, and storing the user ID in the viewing history database.

8. The non-transitory computer readable medium including the sales support program according to claim 6, wherein, when it is found that the user who tries to access is not a registered user in accordance with the authentication at the authentication procedure, the program causes a computer of the application server device to further execute a data update procedure to update data in the viewing history database by allocating, as a user ID corresponding to the user, a user ID including an arbitrary text string, which is not stored in the viewing history database and thus input by a user, to a pair of the data of the name of the storage medium storing the content owned by the user transmitted from the reproduction device and the individual identification ID allocated to the storage medium transmitted from the reproduction device, and storing the user ID in the viewing history database.

* * * * *